(12) United States Patent
Ravikovitch et al.

(10) Patent No.: US 8,784,535 B2
(45) Date of Patent: Jul. 22, 2014

(54) PRESSURE-TEMPERATURE SWING ADSORPTION PROCESS FOR THE SEPARATION OF HEAVY HYDROCARBONS FROM NATURAL GAS STREAMS

(75) Inventors: Peter I. Ravikovitch, Princeton, NJ (US); Robert A. Johnson, Yardley, PA (US); Harry W. Deckman, Clinton, NJ (US); Thomas N. Anderson, Houston, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 150 days.

(21) Appl. No.: 13/406,019

(22) Filed: Feb. 27, 2012

(65) Prior Publication Data

US 2012/0222552 A1  Sep. 6, 2012

Related U.S. Application Data

(60) Provisional application No. 61/447,877, filed on Mar. 1, 2011, provisional application No. 61/447,806, filed on Mar. 1, 2011, provisional application No. 61/447,812, filed on Mar. 1, 2011, provisional application No. 61/447,824, filed on Mar. 1, 2011, provisional application No. 61/447,848, filed on Mar. 1, 2011, provisional application No. 61/447,869, filed on Mar. 1, 2011, provisional application No. 61/447,835, filed on Mar. 1, 2011.

(51) Int. Cl.
*B01D 53/047* (2006.01)

(52) U.S. Cl.
USPC ........... 95/98; 95/99; 95/100; 95/115; 95/143

(58) Field of Classification Search
USPC ............. 95/96–100, 103–106, 115, 143, 900, 95/902
See application file for complete search history.

(56) References Cited

U.S. PATENT DOCUMENTS

| 2,989,383 A | 6/1961 | Miller |
| 3,594,983 A | 7/1971 | Yearout |

(Continued)

FOREIGN PATENT DOCUMENTS

| CN | 101475430 A | 7/2009 |
| EP | 1 421 986 B1 | 5/2004 |

(Continued)

OTHER PUBLICATIONS

Rezaei F. et al.: "Structured absorbents in gas separation processes". Separation and Purification Technology, Elsevier Science, Amsterdam, NL, vol. 70, No. 3, Jan. 12, 2012, pp. 243-256, ISSN: 1383-5866.

(Continued)

*Primary Examiner* — Frank Lawrence
(74) *Attorney, Agent, or Firm* — Bruce M. Bordelon; David M. Weisberg

(57) ABSTRACT

The present invention relates to a pressure-temperature swing adsorption process wherein gaseous components that have been adsorbed can be recovered from the adsorbent bed at elevated pressures. In particular, the present invention relates to a pressure-temperature swing adsorption process for the separation of $C_{2+}$ hydrocarbons (hydrocarbons with at least 2 carbon atoms) from natural gas streams to obtain a high purity methane product stream. In more preferred embodiments of the present processes, the processes may be used to obtain multiple, high purity hydrocarbon product streams from natural gas stream feeds resulting in a chromatographic-like fractionation with recovery of high purity individual gaseous component streams.

35 Claims, 2 Drawing Sheets

(56) References Cited

U.S. PATENT DOCUMENTS

| | | | |
|---|---|---|---|
| 4,094,652 A | 6/1978 | Lowther | |
| 4,269,611 A | 5/1981 | Anderberg | |
| 4,312,641 A | 1/1982 | Verrando et al. | |
| 4,329,158 A | 5/1982 | Sircar | |
| 4,350,501 A | 9/1982 | Bannon | |
| 4,405,343 A | 9/1983 | Othmer | |
| 4,424,837 A | 1/1984 | Farrell | |
| 4,433,707 A | 2/1984 | Farnham | |
| 4,640,694 A | 2/1987 | Leitgeb et al. | |
| 4,702,903 A | 10/1987 | Keefer | |
| 4,729,982 A | 3/1988 | Thistlethwaite et al. | |
| 4,753,919 A | 6/1988 | Whittenberger | |
| 4,772,579 A | 9/1988 | Thistlethwaite et al. | |
| 4,801,308 A | 1/1989 | Keefer | |
| 4,914,218 A | 4/1990 | Kumar et al. | |
| 4,968,329 A | 11/1990 | Keefer | |
| 5,057,296 A | 10/1991 | Beck | |
| 5,074,892 A | 12/1991 | Leavitt | |
| 5,082,473 A | 1/1992 | Keefer | |
| 5,089,034 A | 2/1992 | Markovs et al. | |
| 5,098,684 A | 3/1992 | Kresge et al. | |
| 5,102,643 A | 4/1992 | Kresge et al. | |
| 5,108,725 A | 4/1992 | Beck et al. | |
| 5,141,725 A | 8/1992 | Ramprasad et al. | |
| 5,171,333 A | 12/1992 | Maurer | |
| 5,225,174 A | 7/1993 | Friesen et al. | |
| 5,256,172 A | 10/1993 | Keefer | |
| 5,271,762 A | 12/1993 | Schoofs et al. | |
| 5,298,054 A | 3/1994 | Malik | |
| 5,516,745 A | 5/1996 | Friesen et al. | |
| 5,557,030 A * | 9/1996 | Markovs et al. | 585/826 |
| 5,626,033 A | 5/1997 | Tamhankar et al. | |
| 5,669,962 A | 9/1997 | Dunne | |
| 5,792,897 A | 8/1998 | Rosser, Jr. et al. | |
| 5,846,295 A | 12/1998 | Kalbassi et al. | |
| 5,958,368 A | 9/1999 | Ryoo et al. | |
| 6,051,050 A | 4/2000 | Keefer et al. | |
| 6,063,161 A | 5/2000 | Keefer et al. | |
| 6,077,457 A | 6/2000 | Friesen et al. | |
| 6,080,226 A | 6/2000 | Dolan et al. | |
| 6,136,222 A | 10/2000 | Friesen et al. | |
| 6,197,092 B1 | 3/2001 | Butwell et al. | |
| 6,293,998 B1 | 9/2001 | Dolan et al. | |
| 6,315,817 B1 | 11/2001 | Butwell et al. | |
| 6,336,957 B1 | 1/2002 | Tsymerman | |
| 6,406,523 B1 | 6/2002 | Connor et al. | |
| 6,475,265 B1 | 11/2002 | Baksh et al. | |
| 6,514,318 B2 | 2/2003 | Keefer | |
| 6,607,584 B2 | 8/2003 | Moreau et al. | |
| 6,610,124 B1 * | 8/2003 | Dolan et al. | 95/98 |
| 6,629,525 B2 | 10/2003 | Hill et al. | |
| 6,651,658 B1 | 11/2003 | Hill et al. | |
| 6,652,627 B1 | 11/2003 | Tonkovich et al. | |
| 6,691,702 B2 | 2/2004 | Appel et al. | |
| 6,905,592 B2 | 6/2005 | Bence et al. | |
| 7,049,259 B1 | 5/2006 | Deckman et al. | |
| 7,231,784 B2 | 6/2007 | Howard et al. | |
| 7,270,792 B2 | 9/2007 | Deckman et al. | |
| 7,491,250 B2 | 2/2009 | Hershkowitz et al. | |
| 7,507,274 B2 | 3/2009 | Tonkovich et al. | |
| 7,524,358 B2 | 4/2009 | Saxena et al. | |
| 7,527,670 B2 | 5/2009 | Ackley et al. | |
| 7,799,730 B2 | 9/2010 | Ringer et al. | |
| 7,803,215 B2 | 9/2010 | Russell et al. | |
| 7,938,886 B2 | 5/2011 | Hershkowitz et al. | |
| 7,959,720 B2 | 6/2011 | Deckman et al. | |
| 2003/0015093 A1 | 1/2003 | Wegeng et al. | |
| 2003/0116016 A1 | 6/2003 | Monzyk et al. | |
| 2005/0045030 A1 | 3/2005 | Tonkovich et al. | |
| 2006/0075777 A1 | 4/2006 | Howard et al. | |
| 2006/0102519 A1 | 5/2006 | Tonkovich et al. | |
| 2006/0162556 A1 | 7/2006 | Ackley et al. | |
| 2006/0165574 A1 | 7/2006 | Sayari | |
| 2006/0191410 A1 * | 8/2006 | Dolan et al. | 95/96 |
| 2006/0210454 A1 | 9/2006 | Saxena et al. | |
| 2006/0249020 A1 | 11/2006 | Tonkovich et al. | |
| 2007/0085227 A1 | 4/2007 | Tonkovich et al. | |
| 2007/0240449 A1 | 10/2007 | Howard et al. | |
| 2007/0246106 A1 | 10/2007 | Tonkovich et al. | |
| 2008/0028286 A1 | 1/2008 | Chick | |
| 2008/0282884 A1 | 11/2008 | Kelley et al. | |
| 2008/0282885 A1 | 11/2008 | Deckman et al. | |
| 2008/0282886 A1 | 11/2008 | Reyes et al. | |
| 2008/0282887 A1 | 11/2008 | Chance et al. | |
| 2008/0282892 A1 | 11/2008 | Deckman et al. | |
| 2008/0314245 A1 * | 12/2008 | Hershkowitz et al. | 95/115 |
| 2009/0151562 A1 | 6/2009 | Russell et al. | |
| 2009/0211441 A1 | 8/2009 | Reyes et al. | |
| 2009/0216059 A1 * | 8/2009 | Reyes et al. | 585/823 |
| 2009/0217691 A1 | 9/2009 | Schmidt et al. | |
| 2009/0294348 A1 | 12/2009 | Krogue et al. | |
| 2009/0308248 A1 | 12/2009 | Siskin et al. | |
| 2009/0326279 A1 | 12/2009 | Tonkovich et al. | |
| 2010/0251887 A1 | 10/2010 | Jain | |
| 2010/0263534 A1 | 10/2010 | Chuang | |
| 2010/0326272 A1 | 12/2010 | Asaro et al. | |
| 2012/0222551 A1 | 9/2012 | Deckman | |
| 2012/0222553 A1 | 9/2012 | Kamakoti et al. | |
| 2012/0312163 A1 * | 12/2012 | Leta et al. | 95/97 |

FOREIGN PATENT DOCUMENTS

| | | |
|---|---|---|
| EP | 1080771 B1 | 10/2007 |
| JP | 2000317244 A | 11/2000 |
| JP | 2002326810 A | 11/2002 |
| WO | 92/05859 | 4/1992 |
| WO | 96/14917 | 5/1996 |
| WO | 02/087730 A2 | 11/2002 |
| WO | 2005/061100 A1 | 7/2005 |
| WO | 2008/000380 A1 | 1/2008 |
| WO | 2008/143826 A1 | 11/2008 |
| WO | 2008/143966 A1 | 11/2008 |
| WO | 2009/105251 A1 | 8/2009 |
| WO | 2010/064121 A8 | 6/2010 |
| WO | 2010/096916 A1 | 9/2010 |
| WO | 2010/130787 A1 | 11/2010 |

OTHER PUBLICATIONS

Ruthven, D. M., Thaeron, C. "Performance of a parallel passage adsorbent contactor", Separation and Purification Technology, vol. 12 (1997), pp. 43-60.

Suib, Steven L., O'Young, Chi-Lin "Synthesis of Octahedral Molecular Sieves and Layered Materials", Marcel Dekker, Inc., vol. 69 (1997), pp. 215-231.

Zhao, Dongyuan, Feng, Jianglin, Huo, Qishing, Melosh, Nicholas, Fredrickson, Glenn H., Chmelka, Bradley F., Stucky, Galen D. "Triblock Copolymer Syntheses of Mesoporous Silica with Periodic 50 to 300 Angstrom Pores", Science, vol. 279 (Jan. 23, 1998), pp. 548-552.

Zamani, Cyrus, Illa, Xavi, Abdollahzadeh-Ghom, Sara, Morante, J. R., Rodriguez, Albert Romano "Mesoporous Silica: A Suitable Adsorbent for Amines", Nanoscale Res Lett, vol. 4 (2009), pp. 1303-1308.

Santos, Monica S., Grande, Carlos A., Rodrigues, Alirio E. "New cycle configuration to enhance performance of kinetic PSA processes", Chemical Engineering Science 66 (2011) pp. 1590-1599.

Office Action dated Oct. 22, 2013 issued in U.S. Appl. No. 13/406,079.

Office Action dated Oct. 22, 2013 issued in U.S. Appl. No. 13/406,116.

Office Action dated Oct. 25, 2013 issued in U.S. Appl. No. 13/406,083.

* cited by examiner

PRESSURE-TEMPERATURE SWING ADSORPTION PROCESS FOR THE SEPARATION OF HEAVY HYDROCARBONS FROM NATURAL GAS STREAMS

CROSS-REFERENCE TO RELATED APPLICATIONS

This application claims priority to U.S. Ser. No. 61/447,877, filed Mar. 1, 2011, herein incorporated by reference in its entirety. This application further claims priority to related U.S. Ser. Nos. 61/447,806, 61/447,812, 61/447,824, 61/447,848, 61/447,869, and 61/447,835, each filed Mar. 1, 2011, and each being incorporated by reference herein in its entirety, as well as the six U.S. non-provisional applications filed on even date herewith and claiming priority thereto, each of which being additionally incorporated by reference herein in their entirety.

This application is further related to co-pending U.S. Ser. Nos. 61/448,117, 61/448,120, 61/448,121, 61/448,123, and 61/448,125, each filed Mar. 1, 2011, Ser. No. 61/594,824 filed Feb. 3, 2012, and the application entitled "Apparatus and Systems having a Rotary Valve Assembly and Swing Adsorption Processes Related Thereto" by Robert F. Tammera et al. filed on even date herewith, each being incorporated by reference herein in its entirety, as well as any U.S. non-provisional applications claiming priority thereto and presumably filed on even date herewith, each of which being additionally incorporated by reference herein in their entirety.

FIELD OF THE INVENTION

The present invention relates to a pressure-temperature swing adsorption process wherein gaseous components that have been adsorbed can be recovered from the adsorbent bed at elevated pressures. In particular, the present invention relates to a pressure-temperature swing adsorption process for the separation of $C_{2+}$ hydrocarbons (hydrocarbons with at least 2 carbon atoms) from natural gas streams to obtain a high purity methane product stream.

BACKGROUND OF THE INVENTION

Natural gas is being ever more important as a source of fuel for both building heating as well as a transportation fuel. Natural gas is comprised primarily of methane with up to about 20 wt % heavier ($C_{2+}$) hydrocarbons, primarily ethane. Natural gas also typically contains varying amounts of a number of contaminants, such as acid gases ($CO_2$ and $H_2S$), nitrogen, helium, water, mercury etc. Before natural gas can be used as a fuel, it must undergo processing to remove almost all material other than methane. Processing usually starts at the wellhead with removal of condensate and water followed by the removal of acid gases by various techniques including amine treating, swing adsorption, etc. Nitrogen may also need to be removed to meet pipeline or final product specifications. Heavier hydrocarbons are typically removed by use of a fractionation train. The fractionation train generally consists of up to three cryogenic distillation towers in series: a deethanizer, depropanizer, and a debutanizer The overhead product from the deethanizer is ethane and the bottoms are fed to the depropanizer. The overhead product from the depropanizer is propane and the bottoms are fed to a debutanizer and the overhead product from debutanizer is typically a mixture of normal and iso-butane, and the bottoms product is a $C_{5+}$ mixture. The recovered streams of propane and butane and $C_{5+}$ can be "sweetened" to convert undesirable mercaptans into disulfides and, along with the recovered ethane, are typically the final natural gas liquid (NGL) by-products from the gas processing plant. Alternatively, the NGL stream can be transported directly without fractionation—to a refinery or other processing plant where it can be processed or separated into similar component streams.

Present commercial practices for fractionation and recovery of valuable heavy hydrocarbons ($C_{2+}$) from natural gas streams involve considerable energy input and equipment. As previously mentioned, in a typical NGL recovery plant the whole gas stream is chilled and passed through multiple distillation columns such as a demethanizer, deethanizer, depropanizer, and debutanizer A purified methane stream from the top of demethanizer tower requires significant recompression to a pressure appropriate for a pipeline. It is estimated that recovery of heavy hydrocarbons from a roughly 1 BSCFD gas stream containing roughly 6% of heavy hydrocarbons requires about 100 MW of power in the NGL plant alone, and an additional about 70 MW for re-compression back to pipeline pressure.

Therefore, there exists a need in the art for the recovery of heavy hydrocarbons from natural gas streams by more economical and efficient processes.

SUMMARY OF THE INVENTION

One aspect of the present invention relates to a process for the separation of $C_{2+}$ hydrocarbons from a natural gas stream, which process comprises: a) subjecting said natural gas stream to an adsorption step by introducing it into the feed input end of an adsorbent bed selective for adsorbing said $C_{2+}$ hydrocarbons, which adsorbent bed comprises at least one adsorbent material and a feed input end and a product output end, and which adsorbent bed is operated at a first pressure and a first temperature wherein $C_{2+}$ hydrocarbons are selectively adsorbed by the adsorbent bed and wherein a first $C_1$ product stream which has a higher mol % of $C_1$ hydrocarbons than said natural gas stream is retrieved from the product output end of said adsorbent bed; b) stopping the introduction of said natural gas stream; c) depressurizing said adsorption bed to a second pressure lower than said first pressure; d) externally heating said depressurized adsorbent bed to a second temperature, which second temperature is greater than said first temperature, thereby causing at least a fraction of the adsorbed $C_{2+}$ hydrocarbons to desorb from the adsorbent bed; e) counter-currently flowing through said heated adsorbent bed a first purge gas stream at a third pressure; and f) recovering a $C_{2+}$ product stream comprising $C_{2+}$ hydrocarbon components and methane.

In certain embodiments, the process can further comprise the steps of: g) externally cooling said adsorbent bed to a third temperature, which third temperature is lower than said second; and h) repressurizing the adsorbent bed to within 90% of said first pressure.

Additionally or alternately, the first $C_1$ product stream and/or the first purge gas stream can be greater than 95 mol % methane.

Further additionally or alternately, the first temperature can be from −195° C. to 300° C., the first pressure can be from 1 bara to 600 bara, and/or the second temperature can be from 10° C. to 300° C.

Still further additionally or alternately, the process can further comprise a step wherein a second purge gas stream (e.g., preferably comprising or comprised of propane) is passed co-currently through the adsorption bed following depressurization step (c) and prior to heating step (d). Yet further additionally or alternately, a first $C_2$ or $C_{2+}$ product stream having a higher mol % of $C_2$ or $C_{2+}$ hydrocarbons than said natural gas stream can be retrieved from the product output end of said adsorbent bed, and/or the retrieving of the first $C_2$ or $C_{2+}$ product stream can be performed concurrently with passing the second purge gas stream through the adsorption bed.

DETAILED DESCRIPTION OF THE EMBODIMENTS

Figure 1:
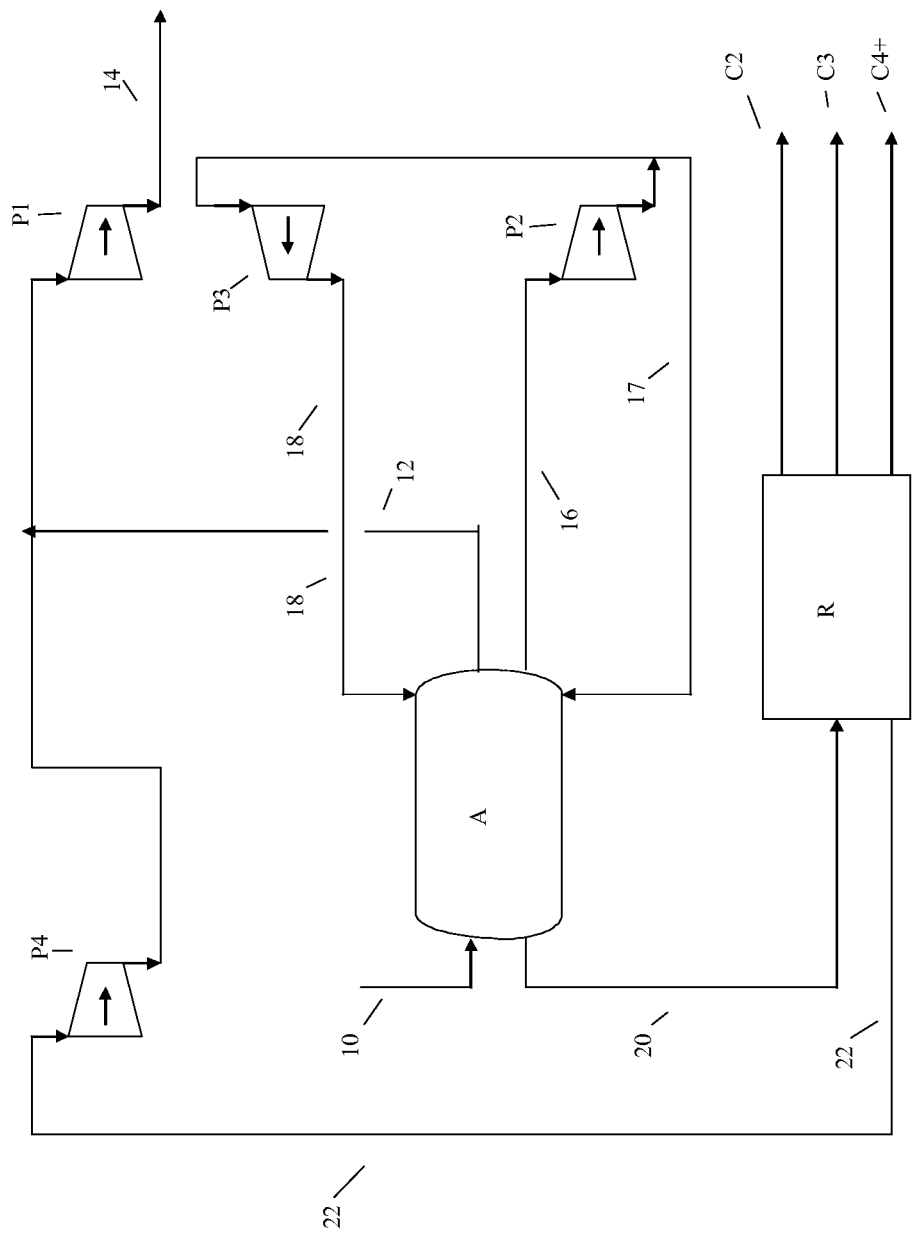
FIG. 1 is a schematic representation of a PTSA process according to an embodiment of the invention.

The present invention relates to a process for the separation of a mixture of heavy hydrocarbons ($C_{2+}$) from natural gas using cyclic pressure and temperature swing adsorption (PTSA). Heavy hydrocarbon removal may be desirable for dew point conditioning before natural gas shipping via pipeline and/or to condition natural gas before liquefying. Additionally or alternately, heavy hydrocarbons can be recovered from produced gas in enhanced oil recovery (EOR) floods employing $CO_2$ and nitrogen. Further additionally or alternately, heavy hydrocarbons can be recovered from associated gas cycled back into an oil reservoir during some types of oil production. In many instances where it is desirable to recover heavy hydrocarbons, the gas can be at pressures in excess of 1,000 psia or, in some instances, in excess of 7,000 psia. It can be advantageous in certain processing applications to use an adsorbent formulated with a microporous zeolite, e.g., having a pore size between about 5 angstroms and about 20 angstroms. Non-limiting examples of such zeolites can include, but are not limited to, MFI, faujasite, MCM-41, Beta, and combinations and intergrowths thereof. In certain embodiments, the Si/Al ratio of zeolites utilized for heavy hydrocarbon removal can be from about 20 to about 1000, preferably from about 200 to about 1000, e.g., in order to prevent excessive fouling of the adsorbent.

High purity chromatographic-like separation and high recovery of hydrocarbon component streams, preferably of individual high purity hydrocarbon component streams, can be enabled through a combination of judicious choice of adsorbent material and process cycle design as disclosed herein. In preferred embodiments herein, highly siliceous adsorbents can be utilized in separating heavy hydrocarbons such as ethane, propane, butane, and larger hydrocarbons from natural gas streams. A benefit of the present invention can include the reduction in energy and size requirements, in some cases also a reduction in the number of cryogenic separation towers utilized (needed) in conventional natural gas liquid (NGL) recovery plants.

In reducing the energy requirements, the present invention can utilize novel PTSA processes to produce a substantially pure methane stream at relatively high operating pressures (e.g., above about 250 psig or at least about 500 psig) and, as such, to not require significant recompression for pipeline transportation and/or for further processing. A component can be considered "substantially pure" herein if that component has a purity of at least 94 mol %, preferably at least 95 mol %, e.g., at least 96 mol %, at least 97 mol %, at least 98 mol %, at least 99 mol %, at least 99.5 mol %, at least 99.8 mol %, at least 99.9 mol %, at least 99.95 mol %, at least 99.98 mol %, or at least 99.99 mol %. A composition can, conversely, be considered "substantially free" of a component if that component is present in amounts less than 6 mol %, preferably less than 5 mol %, e.g., less than 4 mol %, less than 3 mol %, less than 2 mol %, less than 1 mol %, less than 0.5 mol %, less than 0.2 mol %, less than 0.1 mol %, less than 0.05 mol %, less than 0.02 mol %, or less than 0.01 mol %.

In one embodiment, such PTSA processes can produce a substantially pure methane stream at relatively high pressure and a relatively low pressure stream (e.g., below about 100 psig, no more than about 75 psig, or no more than about 50 psig) containing a mixture of heavy hydrocarbons with reduced methane content. This can significantly reduce the size and energy requirements of downstream cryogenic NGL recovery units. Such PTSA processes can optionally produce several relatively low pressure streams, including but not limited to sales quality ethane and propane streams. This can greatly reduce the number of cryogenic separation units required for full fractionation and recovery of all NGL components and, in some cases disclosed herein, can eliminate the need for cryogenic separation units to obtain high purity gas product streams that meet commercial and/or pipeline specifications.

Preferred embodiments according to the present invention involve the separation of a mixture of components by a combination of pressure and thermal swing adsorption (PTSA). The regeneration of the adsorbent bed can include conditions enabling desorption of the preferentially adsorbed component or components, by increasing the temperature of the adsorption bed, e.g., by external means, while maintaining a sufficiently high pressure for subsequent downstream processing equipment. In most cases, it can be desirable to recover relatively high purity component streams at elevated pressures, e.g., to reduce the costs of recompression. Such elevated pressures, in certain embodiments, can be in excess of 40 bara with stream flow rates in excess of $10^8$ SCFD.

The PTSA processes according to the present invention can comprise an adsorption step in which $C_{2+}$ hydrocarbons can be preferentially adsorbed from the natural gas stream by an adsorbent material that, at least in part, makes up an adsorbent bed. As a natural gas stream is a preferred feed to such PTSA processes, the less preferentially adsorbed components can thus preferably include or be treated natural gas streams that are substantially free of heavy ($C_{2+}$) hydrocarbons, e.g., that are composed of substantially pure methane. The adsorption step can produce a process pressure at the outlet end of the contactor that can preferably be managed so as to be no more than 8 bara lower than the feed pressure (as measured at the entrance to the adsorbent bed, i.e., the inlet end of the contactor), e.g., no more than 4 bara lower, no more than 2 bara lower, or no more than 1 bara lower. Additionally or alternately, the adsorption step can advantageously be performed at a first temperature from −195° C. to 300° C., preferably from 20° C. to 150° C. or from 30° C. to 120° C. Further additionally or alternately, total pressures during the adsorption step can range from 1 bara to 600 bara, e.g., from 2 bara to 200 bara or from 10 bara to 150 bara. During the adsorption step, heat of adsorption can be released and the temperature rise from heat of adsorption can preferably be managed. To achieve such control, the system can be designed for the heats of adsorption to be from 5 kJ/mol to 150 kJ/mol of molecules adsorbed. One method to manage the heat of adsorption can be to incorporate a thermal mass into the adsorption bed to mitigate the temperature rise occurring during the adsorption step. With sufficient thermal mass, the heat of adsorption released during the adsorption process can be stored in the adsorbent bed, the thermal mass associated with the adsorbent bed and adsorption vessel. This sensible heat can be recovered from the bed by any suitable means, such as by cross exchanging with a heat transfer fluid, e.g., that flows externally without direct contact with the process gas mixture. The temperature rise from the heat of adsorption can additionally or alternately be managed in a variety of ways, such as by flowing a cooling fluid through the passages external to the adsorbent bed (i.e., the passages that are used to heat and cool the contactor).

Additionally or alternately, the passages external to the adsorbent bed can be filled with a fluid that is not flowing during the adsorption process. In this case, the heat capacity of the fluid can serve to mitigate the temperature rise in the adsorbent bed. Combinations of some or all of these heat management strategies can be employed. Even with these heat management strategies, during this step, the final temperature of the bed can typically be slightly higher than the feed inlet temperature. Preferably, the degree of adsorption and cooling can be managed so that the maximum temperature rise at any point within the contactor can be less than 40° C., e.g., less than 20° C., less than 10° C., or less than 5° C. During adsorption, the strongest-adsorbing components can tend to attach most strongly to the adsorbent and can thus be least mobile. Such strongest-adsorbing components can thus tend to occupy regions of adsorbent closest to the inlet and can generally displace weakly adsorbed components from those regions.

Over the period of adsorption, the adsorbates can tend to order themselves from strongest to weakest, moving from inlet to outlet of the adsorption channels of the contactor. In preferred embodiments, the feed gas velocity can be chosen so that a relatively sharp concentration front moves through the contactor, i.e., such that the concentration gradient of adsorbate(s) extends over a relatively short distance, taking into consideration the absolute amplitude of the gradient. In some instances of the present invention, the leading adsorption front can be allowed to break through the output end for a duration of time sufficient to allow a predetermined amount of $C_2$ or $C_{2+}$ to leave with the $C_1$ product, but it can be preferred in most instances for the leading adsorption front not to be allowed to break through.

The term "break-through" is defined herein as the point where the product gas leaving the adsorbent bed exceeds the target specification of the contaminant component. At the break through point, the adsorbent bed can be considered "spent", such that any significant further operation through the spent adsorption bed alone will result in off-specification product gas. As used herein, the "breakthrough" can generally coincide with the "adsorption front", i.e., at the time breakthrough is detected at the outlet of the adsorbent bed, the adsorption front is generally located at the end of the adsorption bed.

The adsorption step can be stopped at a predetermined point before the adsorption front breaks through the product output end of the adsorbent bed. In certain preferred embodiments, the adsorption front can move at least 30% of the way down the bed, e.g., at least 50% or at least 80%, before the adsorption step is stopped. Additionally or alternately, the adsorption step can be conducted for a fixed period of time set by the feed flow rate and adsorbent capacity. Further additionally or alternately, the adsorption step can be conducted for a time less than 600 seconds, preferably less than 120 seconds, e.g., less than 40 seconds or less than 10 seconds.

The pressure in the adsorbent bed is then reduced, preferably in a series of blow-down steps in a co-current or counter-current and can be performed with or without a purge gas stream to the final target gas recovery pressure. The amount by which the bed pressure is reduced in each blow-down step can be linked to the number of blow-down steps. Pressure reduction preferably occurs in less than 8 steps, preferably in less than 4 steps, with target species being recovered in each step. In one preferred embodiment, the pressure is decreased by a factor of approximately three in each step. In some embodiments, it can be preferred for the depressurization to be conducted counter-currently. Heat can be externally applied to the adsorbent bed to achieve a second temperature higher than the first temperature. By "externally heated" we mean that heat is not applied directly to the adsorbent bed through the flow channels through which the feed gas mixture had flowed and into which the $C_{2+}$ hydrocarbon components will be desorbed. The heat can preferably be delivered to the adsorbent bed through a plurality of heating/cooling channels in thermal communication, but not in fluid communication, with the feed gas flow channels of the adsorbent. The adsorbent bed can be externally heated co-currently or counter-currently along its length with respect to the flow of the feed gas mixture, or in a combination of co-current and counter-current heating steps. The flow channels that will carry heating and cooling fluid can preferably be in physical contact with the adsorbent bed to enhance heat transfer. Optionally, the adsorbent bed can be sealed on one end. The adsorbent bed can be heated to a second temperature higher than the first temperature used during the adsorption step, the second temperature preferably at least 10° C. higher than the first temperature, e.g., at least 20° C. higher, at least 40° C. higher, or at least 90° C. higher; additionally or alternately, the second temperature can be from 10° C. to 300° C., e.g., from 20° C. to 200° C. or from 40° C. to 120° C.

The external heating can be conducted such that a thermal wave is used to pass heat through the contactor, as it transitions from the adsorption step to the regeneration step, in transitioning from the regeneration to adsorption step, in at least part of the regeneration step, and/or in at least part of the adsorption step. Similarly, it can be preferred to utilize a thermal wave in the cooling step. The use of a thermal wave in temperature swing adsorption is disclosed in detail in U.S. Patent Application Publication No. 2008/0314245, which is incorporated herein by reference. A thermal wave is a relatively sharp temperature gradient, or front, that can move linearly (i.e., approximately in a single direction within the contactor) during at least one step in the thermal swing adsorption/desorption cycle. The speed at which the thermal front (i.e., region with sharp temperature gradient) can move is referred to as the thermal wave velocity. The thermal wave velocity need not be constant, and the thermal wave direction need not be the same in both adsorption and regeneration steps. For example, the wave can move co-currently, counter-currently, or cross-flow in the adsorption and/or regeneration steps. It is also possible to design a process in which there is no significant thermal wave present in the adsorption step while there is a significant thermal wave in the regeneration step. The presence of a thermal wave in at least some portion of the thermal swing adsorption/regeneration cycle can enable the overall system to achieve a goal of substantially recuperating and recovering the heat required to temperature-swing the adsorbent bed. This, in turn, can improve process efficiency and/or can enable the use of high desorption temperatures that would not normally be considered for TSA operation.

In certain embodiments of the present invention the contactor is combined with an adsorbent into a heat exchange structure in a manner that can produce a thermal wave. In Thermal Wave Adsorption (TWA), adsorbent can be placed in one set of heat exchanger channels, while the other set of channels can be used to bring heat into and/or take heat out of the adsorbent device. Fluids and/or gases flowing in the adsorbent and heating/cooling channels do not generally contact each other. In many embodiments, the heat adding/removing channels can be designed and operated in a manner that results in a relatively sharp temperature wave in both the adsorbent and in the heating and cooling fluids during the heating and cooling steps in the cycle.

Thermal waves in such contactors can be produced in when the heating and cooling fluids are flowed co-current or counter-current to the direction of the feed flow in the adsorption step. In many cases, it can be preferred not to have a significant flow of heating or cooling fluids during the adsorption step. A more comprehensive description of Thermal Wave Adsorption (TWA) and other appropriate contactor structures can be found, e.g., in U.S. Pat. No. 7,938,886, which is incorporated herein by reference. This reference shows how to design and operate a contactor to control the sharpness and nature of a thermal wave. A key operational parameter can include the fluid velocity in the contactor. Key design parameters can include the mass of the contactor and heat capacity and thermal conductivity of materials used to form the contactor and heat transfer fluid. An additional key design objective for the contactor can be finding one or more ways to reduce/minimize the distance over which heat has to be transferred, which is why relatively sharp thermal waves can be so desirable.

During the heating step, the volume of fluid at a temperature no more than 10° C. warmer than the end of the contactor from which it is produced can, in some embodiments, represent at least 25% (e.g., at least 50% or at least 75%) of the volume of the fluid introduced into the contactor for heating. Similarly, when the present invention is operated to attain a thermal wave, it can be preferred that, during the cooling step, a cold fluid (such as pressurized water) can be flowed into the contactor and a hot fluid near the temperature of the contactor at the end of the recovery step can flow out of the contactor. Most of the recovery step can generally occur after the contactor has been heated. Thus additionally or alternately, during the cooling step, the volume of fluid at a temperature no more than 10° C. colder than the end of the contactor from which it is produced can represent at least 25% (e.g., at least 50% or at least 75%) of the volume of the fluid introduced into the contactor for cooling.

One way to efficiently utilize thermal waves in the apparatuses according to the invention can be for heat recovery. The recovered energy can be used to reduce the energy requirements for heating and cooling of the contactor, for a different contactor of a multitude of contactors needed for a continuous process, and/or for any other purpose. More specifically, energy contained in the hot stream exiting the contactor during the cooling step can be utilized to reduce the energy that must be supplied during the heating step. Similarly, the cold stream exiting the contactor during the heating step can be utilized to reduce the energy that must be supplied to cool fluid to be supplied to the contactor during the cooling step. There are many ways to recoup the energy. For example, the hot thermal fluid flowing out of one contactor can be sent to another with trim heating in between, and/or the cold fluid flowing out of one contactor can be sent to another with trim cooling in between. The thermal fluid flow path between contactors can be determined by valves timed to route thermal fluid between contactors at appropriate points in the overall swing adsorption cycle. In embodiments where thermal fluid flows between contactors, it may also pass through a heat exchanger that adds or removes heat from the flowing thermal fluid and/or pass through a device, such as a compressor, pump, and/or blower, that pressurizes it so it can flow at the desired rate though the contactors. A heat storage medium can be configured so that the energy from the thermal wave moving through one contactor can be stored. A non-limiting example is a tank system that separately stores hot and cold fluids, which can each be fed back into the contactor that produced it and/or to another contactor. In many embodiments, the flow of the thermal fluid through the contactor can be arranged to minimize the mixing of the fluid in the direction of the general flow of the fluid through the contactor and to minimize the effect of the thermal conductivity of the fluid on the sharpness of the temperature wave.

Where energy is recovered, it can be preferred that the recovered energy be used to reduce the amount of sensible heat that must be supplied to heat and cool the contactor. The sensible heat is determined by the heat capacity and temperature rise (or fall) of the contactor. In some preferred embodiments, at least 60% (e.g., at least 80% or at least 95%) of the sensible heat required for heating the contactor is recouped, and/or at least 60% (e.g., at least 80% or at least 95%) of the sensible heat needed to cool the contactor is recouped.

In embodiments of the processes herein, a purge gas can be flowed co-currently and/or counter-currently through the adsorbent bed simultaneously with the heating of the bed and/or subsequent to the heating step. If a purge is applied during the heating step, the purge gas can preferably be a clean gas, such as a product gas, flowing from the clean end (product end) of the adsorbent bed to the feed end of the bed. In some embodiments, a purpose of this purge with clean gas can be to keep the product end of the bed substantially free of $C_{2+}$ hydrocarbons. Additionally or alternately, the purge gas can have a molar adsorption energy on the absorbent less than or equal to that of methane. Non-limiting examples of such clean gases can include nitrogen and/or methane. Further additionally or alternately, the purge gas can have a higher molar adsorption energy on the adsorbent than that of methane. A non-limiting example of such a purge gas can include a $C_{2+}$ hydrocarbon stream substantially free of methane. The purge can preferably be introduced at a pressure higher than the pressure in the adsorbent bed. Additionally or alternately, the total number of moles of purge gas introduced can be less than 6 times the number of moles of molecules adsorbed in the contactor, e.g., less than 3 times or less than 1 time the number of moles adsorbed.

In certain embodiments, a substantially pure $C_3$ or $C_{3+}$ gas stream can be used as a co-current purge gas. In these processes (e.g., such as in Example 2), the purge gas can assist in the desorption of a relatively high purity $C_2$ (or $C_{2+}$) stream that has been adsorbed from the natural gas. As such, both a high purity $C_1$ stream (obtained as the primary product stream) and a high purity $C_2$ (or $C_{2+}$) stream can be obtained from the same adsorbent bed by controlling the cycle parameters. The $C_3$ or $C_{3+}$ gas stream used in these steps can advantageously be obtained from at least a portion of the product streams obtained from the adsorption process.

In preferred embodiments, the substantially pure $C_3$ or $C_{3+}$ gas stream can be comprised of propane, e.g., can have a propane purity greater than 95 mol % or greater than 98 mol %. Additionally or alternately, the $C_2$ (or $C_{2+}$) product stream can have a higher mol % of $C_2$ (or $C_{2+}$) hydrocarbons than the natural gas stream and can be retrieved from the product output end of the adsorbent bed. In certain preferred embodiments, the $C_2$ (or $C_{2+}$) product stream can have an ethane content greater than 95 mol %, e.g., greater than 98 mol %.

The external heating of the adsorbent bed can result in at least a portion of the $C_{2+}$ hydrocarbon component being desorbed from the adsorbent bed that can be recovered with the purge gas stream and optionally sent to a fractionation step to recover and/or separate $C_1$, $C_2$, $C_3$, and $C_{4+}$ streams, inter alia.

After the target gas has been recovered, the adsorbent bed can be cooled and repressurized. It can generally be preferred to cool the bed before repressurization. The adsorbent bed can be cooled, preferably to a temperature that is no more than 40° C. above the temperature of feed gas mixture, e.g., no more than 20° C. above or no more than 10° C. above. Additionally or alternately, the adsorbent bed can be cooled by external cooling in a co-current or counter-current manner, such that a thermal wave can pass through the bed. In some such embodiments, it can be preferred for the first part of the adsorbent bed to be cooled then repressurized. In certain of those embodiments, less than 90% of the length of adsorption bed can be cooled, e.g., less than 50%. The adsorbent bed can additionally or alternately be purged with a clean gas during cooling.

Relatively sharp thermal waves, as used herein, can be expressed in terms of a standard temperature differential over a distance relative to the length of the mass/heat transfer flow in the apparatus. With respect to the mass/heat transfer, we can define a maximum temperature, $T_{max}$, and a minimum temperature, $T_{min}$, as well as convenient temperatures about 10% above $T_{min}$, ($T_{10}$) and about 10% below $T_{max}$ ($T_{90}$). Thermal waves can be said to be relatively sharp when at least the temperature differential of ($T_{90}-T_{10}$) occurs over at most 50% (e.g., at most 40%, at most 30%, or at most 25%) of the length of the apparatus that participates in the mass/thermal transfer. Additionally or alternately, relative sharp thermal waves can be expressed in terms of a maximum Peclet number, Pe, defined to compare axial velocity of the heating/cooling fluid to diffusive thermal transport roughly perpendicular to the direction of fluid flow. Pe can be defined as $(U*L)/\alpha$, where U represents the velocity of the heating/cooling fluid (in m/s), L represents a characteristic distance over which heat is transported (to warm/cool the adsorbent) in a direction roughly perpendicular to the fluid flow, and $\alpha$ represents the effective thermal diffusivity of the contactor (in $m^2/s$) over the distance L. In addition or alternatively to the thermal differential over length, thermal waves can be said to be relatively sharp when Pe is less than 10, for example less than 1 or less than 0.1. To minimize time for heating/cooling of the contactor with little or no damage to the flow channel, it can be preferred for U to be in a range from about 0.01 m/s to about 100 m/s, e.g., from about 0.1 m/s to about 50 m/s or from about 1 m/s to about 40 m/s. Additionally or alternately, to minimize size and energy requirements, it can be preferred for L to be less than 0.1 meter, e.g., less than 0.01 meter or less than 0.001 meter.

The adsorbent bed can then be repressurized, during and/or after the cooling step, e.g., using clean product gas or counter-currently with blow-down gas from another bed after a first stage of repressurization. The final pressure of the repressurization step can preferably be substantially equal to the pressure of the incoming feed gas mixture.

The cycle time for PTSA processes according to the present invention can advantageously be less than 10 minutes, preferably no more than 2 minutes. Such processes can be used to obtain very high product recoveries advantageously in excess of 90 vol %, e.g., of at least 95 vol % or of at least 98 vol %.

In some embodiments, the adsorbent bed can preferably be in the form of open flow channels, e.g., parallel channel connectors, in which the majority of the open pore volume is attributable to microporous pore diameters, e.g., in which less than 40%, more preferably less than 20%, for example less than 15% or less than 10%, of its open pore volume can originate from pore diameters greater than 20 angstroms (and less than about 1 micron; i.e., from mesoporous and macroporous pore diameters). A flow channel is described herein as that portion of the contactor in which gas flows if a steady state pressure difference is applied between the point/place at which a feed stream enters the contactor and the point/place a product stream leaves the contactor. By "open pore volume" herein, it is meant all of the open pore space not occupied in the volume encompassed by the adsorbent material. The open pore volume includes all open spaces in the volume encompassed by the adsorbent material, including but not limited to all volumes within the adsorbent materials themselves, including the pore volume of the structured or amorphous materials, as well as any interstitial open volumes within the structure of the portion of the bed containing the adsorbent material. Open pore volume, as used herein, does not include spaces not accompanied by the adsorbent material such as open volumes in the vessel for entry, exit, or distribution of gases (such as nozzles or distributor areas), open flow channels, and/or volumes occupied by filler materials and/or solid heat adsorption materials. "Parallel channel contactors" are defined herein as a subset of adsorbent contactors comprising structured (engineered) adsorbents in which substantially parallel flow channels are incorporated into the adsorbent structure (typically the adsorbents can be incorporated onto/into the walls of such flow channels). Non-limiting examples of geometric shapes of parallel channel contactors can include various shaped monoliths having a plurality of substantially parallel channels extending from one end of the monolith to the other; a plurality of tubular members, stacked layers of adsorbent sheets with and without spacers between each sheet; multi-layered spiral rolls; spiral wound adsorbent sheets; bundles of hollow fibers; as well as bundles of substantially parallel solid fibers; and combinations thereof. Parallel flow channels are described in detail, e.g., in U.S. Patent Application Publication Nos. 2008/0282892 and 2008/0282886, both of which are incorporated herein by reference. These flow channels can be formed by a variety of ways, and, in addition to the adsorbent material, the adsorbent contactor structure may contain items such as, but not limited to, support materials, heat sink materials, void reduction components, and heating/cooling passages.

Examples of adsorbent materials that can be used include, but are not limited to, high surface area (greater than about 10 $m^2/g$, preferably greater than about 75 $m^2/g$) alumina, microporous zeolites (preferably with particle sizes less than about 1 mm), other microporous materials, mesoporous materials, ordered mesoporous materials, and the like, and combinations thereof. Non-limiting examples of these materials can include carbon, cationic zeolites, high silica zeolites, highly siliceous ordered mesoporous materials, sol-gel materials, ALPO materials (microporous and/or mesoporous materials containing predominantly aluminum, phosphorous, and oxygen), SAPO materials (microporous and/or mesoporous materials containing predominantly silicon, aluminum, phosphorous, and oxygen), MOF materials (microporous and/or mesoporous materials comprised of a metal organic framework), ZIF materials (microporous and/or mesoporous materials comprised of zeolitic imidazolate frameworks), microporous and/or mesoporous sorbent functionalized with functional groups (e.g., including primary, secondary, and tertiary amines, other non-protogenic basic groups such as amidines, guanidines, biguanides, and the like, as well as combinations thereof), and combinations and intergrowths thereof. For the adsorption and removal of acidic gases such as hydrogen sulfide and carbon dioxide typically found in natural gas streams, adsorbents such as cationic zeolites, amine-functionalized mesoporous materials, stannosilicates, and carbon may advantageously be utilized.

Particularly preferred adsorbent materials utilized for separating natural gas feed streams into high purity methane product streams, and optionally high purity ethane and/or propane streams, can include zeolites selected from framework structures of FER, MFI, BEA, DON, and combinations and intergrowths thereof. Additionally or alternately, the Si/Al ratio of the zeolite adsorbent can be from 2 to about 1000, alternately greater than about 250, greater than about 500, or greater than about 1000.

In some preferred embodiments, the swing adsorption process can be rapidly cycled, in which case the processes according to the present invention can be referred to as rapid cycle thermal swing adsorption (RCTSA), rapid cycle pressure swing adsorption (RCPSA), and rapid cycle partial pressure swing or displacement purge adsorption (RCPPSA). For RCPSA, the total cycle times can typically be less than 90 seconds, preferably less than 60 seconds, e.g., less than 30 seconds, less than 15 seconds, or less than 10 seconds. In contrast, conventional PSA cycle times are typically in excess of 2 to 4 minutes. For RCTSA, the total cycle times can typically be less than 600 seconds, preferably less than 200 seconds, e.g., less than 100 seconds or less than 60 seconds.

Adsorptive kinetic separation processes, apparatuses, and systems, as described above, are useful for development and production of hydrocarbons, such as gas and oil processing. Particularly, the provided processes, apparatuses, and systems can be useful for the rapid, large scale, efficient separation of a variety of target gases from gas mixtures.

The provided processes, apparatuses, and systems may be used to prepare natural gas products by removing contaminants and heavy ($C_{2+}$) hydrocarbons. The provided processes, apparatuses, and systems can be useful for preparing gaseous feed streams for use in utilities, including separation applications such as dew point control, sweetening/detoxification, corrosion protection/control, dehydration, heating value, conditioning, and purification. Examples of utilities that utilize one or more separation applications can include generation of fuel gas, seal gas, non-potable water, blanket gas, instrument and control gas, refrigerant, inert gas, and hydrocarbon recovery. Exemplary "not to exceed" product (or "target") acid gas removal specifications can include: (a) 2 vol % $CO_2$, 4 ppm $H_2S$; (b) 50 ppm $CO_2$, 4 ppm $H_2S$; or (c) 1.5 vol % $CO_2$, 2 ppm $H_2S$.

The provided processes, apparatuses, and systems may be used to remove acid gas from hydrocarbon streams. Acid gas removal technology becomes increasingly important as remaining gas reserves exhibit higher concentrations of acid (sour) gas resources. Hydrocarbon feed streams can vary widely in amount of acid gas, such as from several parts per million to 90 vol %. Non-limiting examples of acid gas concentrations from exemplary gas reserves can include concentrations of at least: (a) 1 vol % $H_2S$, 5 vol % $CO_2$; (b) 1 vol % $H_2S$, 15 vol % $CO_2$; (c) 1 vol % $H_2S$, 60 vol % $CO_2$; (d) 15 vol % $H_2S$, 15 vol % $CO_2$; or (e) 15 vol % $H_2S$, 30 vol % $CO_2$.

One or more of the following may be utilized with the processes, apparatuses, and systems provided herein, to prepare a desirable product stream, while maintaining relatively high hydrocarbon recovery:

(a) using one or more kinetic swing adsorption processes, such as pressure swing adsorption (PSA), thermal swing adsorption (TSA), and partial pressure swing or displacement purge adsorption (PPSA), including combinations of these processes; each swing adsorption process may be utilized with rapid cycles, such as using one or more rapid cycle pressure swing adsorption (RC-PDS) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884, which are each herein incorporated by reference in its entirety;

(b) removing acid gas with RC-TSA using advanced cycles and purges as described in U.S. Provisional Application No. 61/447,858, filed Mar. 1, 2011, claiming priority thereto, which are together incorporated by reference herein in their entirety;

(c) using a mesopore filler to reduce the amount of trapped methane in the adsorbent and increase the overall hydrocarbon recovery, as described in U.S. Patent Application Publication Nos. 2008/0282892, 2008/0282885, and 2008/028286, each of which is herein incorporated by reference in its entirety;

(d) choosing an appropriate adsorbent materials to provide high selectivity and reduce/minimize adsorption (and losses) of methane and other hydrocarbons, such as one or more of the zeolites described in U.S. Patent Application Publication Nos. 2008/0282887 and 2009/0211441, each of which is herein incorporated by reference in its entirety;

(e) depressurizing one or more RC-TSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor to optimize the overall compression system;

(f) using exhaust or recycle streams to minimize processing and hydrocarbon losses, such as using exhaust streams from one or more RC-TSA units as fuel gas instead of re-injecting or venting;

(g) using multiple adsorbent materials in a single bed to remove trace amounts of first contaminants, such as $H_2S$, before removal of a second contaminant, such as $CO_2$; such segmented beds may provide rigorous acid gas removal down to ppm levels with RC-TSA units with minimal purge flow rates;

(h) using feed compression before one or more RC-TSA units to achieve a desired product purity;

(j) contemporaneous removal of non-acid gas contaminants such as mercaptans, COS, and BTEX; selection processes and materials to accomplish the same;

(k) using structured adsorbents for gas-solid contactors to minimize pressure drop compared to conventional packed beds;

(l) selecting a cycle time and cycle steps based on adsorbent material kinetics; and (m) using a process and apparatus that uses, among other equipment, two RC-TSA units in series, wherein the first RC-TSA unit cleans a feed stream down to a desired product purity and the second RC-TSA unit cleans the exhaust from the first unit to capture methane and maintain high hydrocarbon recovery; use of this series design may reduce the need for a mesopore filler.

The processes, apparatuses, and systems provided herein can be useful in large gas treating facilities, such as facilities that process more than five million standard cubic feet per day (MSCFD) of natural gas, for example more than 15 MSCFD, more than 25 MSCFD, more than 50 MSCFD, more than 100 MSCFD, more than 500 MSCFD, more than one billion standard cubic feet per day (BSCFD), or more than two BSCFD.

Compared to conventional technology, the provided processes, apparatuses, and systems can require lower capital investment, lower operating cost, and/or less physical space, thereby enabling implementation offshore and in remote locations, such as arctic environments. The provided processes, apparatuses, and systems can provide the foregoing benefits, while providing high hydrocarbon recovery as compared to conventional technology.

Additionally or alternately, the invention can comprise one or more of the following embodiments.

Embodiment 1. A process for the separation of $C_{2+}$ hydrocarbons from a natural gas stream, which process comprises: a) subjecting said natural gas stream to an adsorption step by introducing it into the feed input end of an adsorbent bed selective for adsorbing said $C_{2+}$ hydrocarbons, which adsorbent bed comprises at least one adsorbent material and a feed input end and a product output end, and which adsorbent bed is operated at a first pressure and a first temperature wherein $C_{2+}$ hydrocarbons are selectively adsorbed by the adsorbent bed and wherein a first $C_1$ product stream having a higher mol % of $C_1$ hydrocarbons than said natural gas stream is retrieved from the product output end of said adsorbent bed; b) stopping the introduction of said natural gas stream; c) depressurizing said adsorption bed to a second pressure lower than said first pressure; d) externally heating said depressurized adsorbent bed to a second temperature greater than said first temperature, thereby causing at least a fraction of the adsorbed $C_{2+}$ hydrocarbons to desorb from the adsorbent bed; e) counter-currently flowing through said heated adsorbent bed a first purge gas stream at a third pressure; f) recovering a $C_{2+}$ product stream comprising $C_{2+}$ hydrocarbon components and methane; optionally g) externally cooling said adsorbent bed to a third temperature lower than said second temperature; and optionally h) repressurizing the adsorbent bed to within 90% of said first pressure.

Embodiment 2. The process of embodiment 1, wherein one or more of the following are satisfied: the first $C_1$ product stream is greater than 95 mol % methane, e.g., greater than 98 mol % methane; the first purge gas stream is selected from the group consisting of nitrogen and methane; the first purge gas stream is greater than 95 mol % methane; the first temperature is from −195° C. to 300° C., e.g., from 20° C. to 150° C.; the first pressure is from 1 bara to 600 bara, e.g., from 2 to 200 bara; the second temperature is from 10° C. to 300° C., e.g., from 20° C. to 200° C.; the third temperature is from −195° C. to 300° C.; and the first pressure is at least 500 psig.

Embodiment 3. The process of embodiment 1 or embodiment 2, wherein a second purge gas stream (e.g., comprising propane, such as greater than 95 mol % or greater than 98 mol %) is passed co-currently through the adsorption bed following depressurization step (c) and prior to heating step (d).

Embodiment 4. The process of embodiment 3, further comprising retrieving from the product output end of said adsorbent bed (e.g., concurrently with passing the second purge gas stream through the adsorption bed) a first $C_{2+}$ product stream having a higher mol % of $C_{2+}$ hydrocarbons than said natural gas stream, e.g., comprising greater than 95 mol % ethane or greater than 98 mol % ethane.

Embodiment 5. The process of any one of the previous embodiments, wherein the adsorbent bed has open flow channels throughout its entire length through which the natural gas stream flows, e.g., is a parallel channel contactor.

Embodiment 6. The process of any one of the previous embodiments, wherein the reduction in pressure of step c) takes place in two or more steps, and wherein each step reduces the pressure of the adsorbent bed to a lower pressure than the next previous step.

Embodiment 7. The process of any one of the previous embodiments, wherein the external heating of step d) takes place co-current to the direction of the flow through the adsorbent bed; the external heating of step d) takes place counter-current to the direction of the flow through the adsorbent bed.

Embodiment 8. The process of any one of the previous embodiments, wherein the heating of step d) is performed under conditions sufficient to cause a thermal wave to travel along the adsorbent bed, e.g., co-current to the direction the gas mixture flow through the adsorbent bed.

Embodiment 9. The process of embodiment 8, wherein a $T_{90}$ and a $T_{10}$ can be defined with respect to the second temperature and the first temperature such that a temperature differential of $(T_{90}-T_{10})$ occurs over at most 50% of the length of the adsorbent bed.

Embodiment 10. The process of embodiment 8, wherein the thermal wave exhibits a maximum Peclet number, Pe, less than 10, wherein $Pe=(U*L)/\alpha$, where U represents a heat exchange fluid velocity, L represents a characteristic distance over which heat is transported in a direction roughly perpendicular to fluid flow, and $\alpha$ represents an effective thermal diffusivity of the contactor over the distance L, and wherein U is from about 0.01 m/s to about 100 m/s, and L is less than 0.1 meter.

Embodiment 11. The process of any one of the previous embodiments, wherein less than about 40% of the open pores of the adsorbent bed have diameters greater than about 20 angstroms and less than about 1 micron.

Embodiment 12. The process of any one of the previous embodiments, wherein the adsorbent bed is comprised of a zeolite adsorbent material comprising a framework structure selected from FER, MFI, BEA, DON, and combinations thereof, e.g., exhibiting an Si/Al ratio of least about 500.

Figure 2:
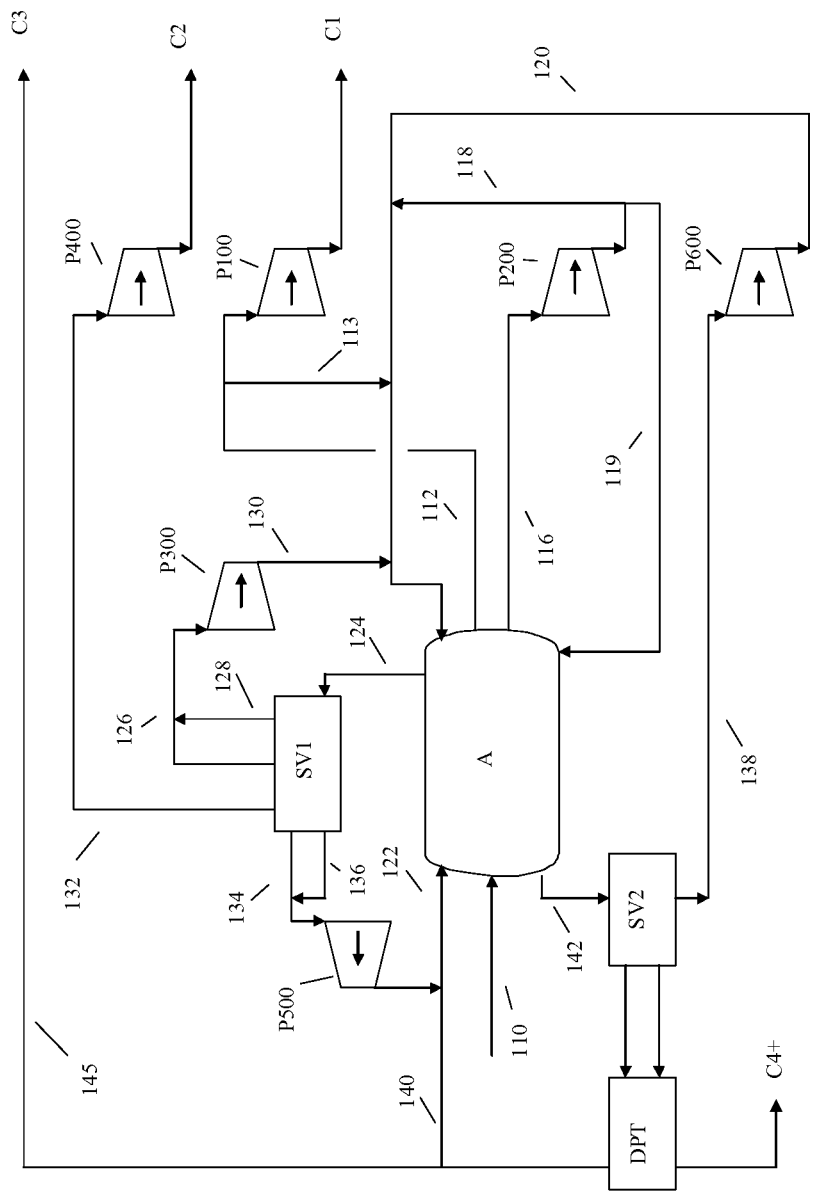
FIG. 2 is a schematic representation of another PTSA process according to an embodiment of the invention.

Embodiment 13. The process of any one of the previous embodiments, wherein the adsorbent bed is comprised of a microporous adsorbent material selected from zeolites, AlPOs, SAPOs, MOFs, ZIFs, carbon, and combinations thereof Embodiment 14. The process of any one of the previous embodiments, wherein the adsorbent bed is comprised of an adsorbent material selected from cationic zeolites, amine-functionalized mesoporous materials, stannosilicates, carbon, and combinations thereof The present invention can be understood in combination with the following Examples, which flow schemes are illustrated in FIGS. 1 and 2 hereof. The following Examples should not be taken as unduly limiting the scope of the present invention, as reflected in the claims that follow.

EXAMPLES

Example 1

In this Example, a PTSA process of the present invention was simulated based on the following process steps:

a) Adsorption of heavy HC and production of purified $C_1$ at high pressure.

b) Co-current blowdown to about 1 bar.

c) Heating the bed with the product end closed and the feed end open.

d) Countercurrent $C_1$ purge at about 3 bar.

e) Cooling the bed with the feed end closed and the product end open.

f) Repressurizing the bed using a combination of feed and internal streams.

The individual cycle times utilized for this adsorption process simulation were as follows:

a) Adsorption for ~8.5 seconds.
b) Co-current blowdown for ~4 seconds.
c) Heating the bed for ~10 seconds.
d) Countercurrent $C_1$ purge for ~2 seconds.
e) Cooling the bed for ~10 seconds.
f) Repressurizing the bed for ~3 seconds.

FIG. 1 hereof is a schematic representation of the above PTSA process steps. A stream of natural gas being conducted via line 10 to a swing adsorption process unit of the present invention A was modeled to flow into the feed input end of an adsorbent bed within the process unit. The feed gas was modeled to flow through the adsorbent bed by way of an adsorption front from the feed inlet to the product outlet end of the adsorbent bed. The swing adsorption process unit described herein was a combination pressure/temperature swing adsorption (PTSA) process unit modeled to be operated at high pressure during the adsorption step, so that adsorbed gas components could be desorbed, and so that the adsorbent bed could be regenerated at elevated temperatures. As previously mentioned, the adsorbent material used of the adsorbent bed(s) was modeled to be preferential for the adsorption of $C_{2+}$ hydrocarbons relative to methane. Adsorption was modeled at a first pressure between 2 bara and 200 bara and at a first temperature between 20° C. and 150° C. During the adsorption step, a methane rich product stream, depleted in $C_{2+}$ hydrocarbons, was modeled to exit the product outlet end of the adsorbent bed and to be passed via line 12 to compressor P1 for compression to pipeline pressure, exiting via line 14.

The adsorption step was stopped and the adsorbent bed then depressurized, in this case by a series of equalization blow-down steps co-current to the flow of feed gas to a second pressure less than the pressure of the adsorption step. This second pressure was in the range of about 1 bara to about 2 bara. The blow-down effluent, in this case substantially pure methane, exited the vessel via line 16 and was pressurized by conducting a portion to compressor P2 for use in later stages as a purge gas via line 17 where it was sent counter-currently through the adsorbent bed during and/or after the heating/desorption step. A portion of the blow-down effluent could optionally be sent via line 18 (preferably through a compressor P3) for repressurizing the adsorbent bed, if desired.

After the blowdown step, the adsorbent bed was externally heated, with the product end of the bed sealed and the inlet end left open, and maintained at a pressure of about 1 bar to achieve desorption of at least a portion of adsorbed $C_{2+}$ hydrocarbons from the adsorbent, which were removed from the bed preferably with a countercurrent flow of purge gas provided by product gas via line 18. The desorbed $C_{2-}$ hydrocarbon stream was passed via line 20 from the feed end of the adsorbent bed and to a recovery process unit R where it was separated, in this case by fractionation, specifically cryogenic distillation to achieve individual, high purity streams of $C_2$, $C_3$, and $C_{4+}$. Any trace $C_1$ product could optionally be recovered in the recovery process unit R and passed via line 22 to compressor P4 (if required) and further to compressor P1 to be compressed, optionally with the methane rich product stream 12 obtained directly from the adsorption unit to pipeline pressures and sent to a pipeline. The $C_2$, $C_3$, and $C_{4+}$ streams, indicated as C2, C3, and C4+, could additionally or alternately be collected as product streams via the recovery process unit R for transfer, sale, and/or further processing.

After the desorption of the adsorbed components, the adsorbent bed was cooled prior to putting the bed back into the adsorption cycle. The adsorbent bed could optionally be purged with a clean gas during this cooling step.

The adsorption bed was then repressurized after the cooling step, in this case with blow-down gas from the equalization step of another bed. The adsorption vessel was then repressurized to the final pressure by use of feed gas (co-current) though clean product gas (counter-current) could alternately be used. The final pressure of the repressurization step was substantially equal to the pressure of incoming feed gas.

Table 1 below shows the stream flow rates and compositions obtained from a detailed dynamic process simulation of the process herein as outlined in FIG. 1 which simulation was built using a custom suite of models developed using the gPROMS® software product. gPROMS® is an advanced process modeling environment, commercially available from Process Systems Enterprises Limited® (PSE) having an office in Cedar Knolls, N.J., USA, and is well known to process engineers in the petroleum and chemical industries. The blow-down effluent was substantially pure $C_1$ which was more than sufficient for the $C_1$ purge step and a portion of the bed repressurization step. The $C_{2+}$ heavy hydrocarbon product stream was the combined effluent from the heating step and the $C_1$ purge step and constituted the feed to the gas recovery plant R. Initial bed repressurization with pure $C_1$ product was counter-current in this case, in order to keep the product end of the bed clean. Final repressurization was co-current to the feed. The flow-rates were modeled based on a total feed rate of 1 BSCFD.

Some advantages of this cycle were observed to include the production of a high pressure, high purity $C_1$ product stream, and reduction, but not complete elimination, of a gas recovery plant.

TABLE 1

Stream compositions for PTSA process with methane ($C_1$) purge

| Stream | Mole Fractions | | | | Flowrate | Pressure |
| --- | --- | --- | --- | --- | --- | --- |
| | C1 | C2 | C3 | C4 | (MSCFD) | (bara) |
| Feed | 0.93 | 0.04 | 0.01 | 0.01 | 877 | 66 |
| C1 Purge | 1.00 | 0.00 | 0.00 | 0.00 | 59 | 3 |
| Repressurization | 1.00 | 0.00 | 0.00 | 0.00 | 123 | 66 |
| C1 Product | 1.00 | 0.00 | 0.00 | 0.00 | 856 | 64 |
| Blowdown | 1.00 | 0.00 | 0.00 | 0.00 | 123 | 1 |
| HHC Product - Total | 0.30 | 0.42 | 0.14 | 0.14 | 81 | 1 |
| Heat | 0.31 | 0.40 | 0.15 | 0.15 | 74 | 1 |
| Purge | 0.30 | 0.70 | 0.00 | 0.00 | 7 | 1 |

Example 2

In this Example, a PTSA process of the present invention was simulated based on the following process steps:

a) Adsorption of heavy HC and production of purified $C_1$ at high pressure.
b) Co-current blowdown to about 9 bar.
c) Co-current purge with substantially pure $C_3$.
d) Countercurrent blowdown to about 1 bar.
e) Heating the bed with the product end closed and the feed end open.
f) Countercurrent purge at about 3 bar with substantially pure methane.
g) Cooling the bed with the feed end closed and the product end open.
h) Repressurizing the bed using a combination of feed and internal streams.

The individual cycle times utilized for this adsorption process simulation were as follows:

a) Adsorption for ~6 seconds.
b) Co-current blowdown for ~3 seconds.
c) Co-current purge with $C_3$ for ~8 seconds.
d) Countercurrent blowdown for ~7 seconds.
e) Heating the bed for ~7 seconds.
f) Countercurrent purge with $C_1$ for ~5 seconds.
g) Cooling the bed for ~3 seconds.
h) Repressurizing the bed for ~10 seconds.

FIG. 2 hereof is a simplified flow scheme of another preferred embodiment of the present invention illustrated by the above PTSA process steps. The process scheme of FIG. 2 hereof is a more complex arrangement with additional steps as compared to Example 1 and corresponding FIG. 1, but, in addition to a high purity $C_1$ product stream, also was modeled to result in individual, high purity $C_2$, $C_3$ and $C_{4+}$ product streams without the need to send a mixture of these hydrocarbons to a gas recovery plant. This can represent a substantial savings over the need for cryogenic distillation towers to produce these individual streams.

As shown in FIG. 2 hereof, a natural gas feed stream conducted via line 110 to a swing adsorption process unit A was modeled to flow into the feed input end of an adsorbent bed within the process unit. The feed gas was modeled to flow through the adsorbent bed by way of an adsorption front from the feed inlet to the product outlet end of the adsorbent bed. The swing adsorption process unit was a combination pressure/temperature swing adsorption (PTSA) process unit modeled to be operated at high pressure during the adsorption step, so that adsorbed gas components could be desorbed, and so that the adsorbent bed could be regenerated at elevated temperatures. As previously mentioned, the adsorbent material used of the adsorbent bed(s) was modeled to be preferential for the adsorption of $C_{2+}$ hydrocarbons relative to methane. Adsorption was modeled at a first pressure between 2 bara and 200 bara and at a first temperature between 20° C. and 150° C. During the adsorption step, a methane rich product stream, depleted in $C_{2+}$ hydrocarbons, was modeled to exit the product outlet end of the adsorbent bed and to be passed via line 112 to compressor P100 for compression to pipeline pressure, exiting as a high purity $C_1$ product stream C1. A portion of the methane rich product stream can optionally be conducted via line 113 to be used as a purge gas and repressurization.

The adsorption step was stopped and the adsorbent bed then depressurized, in this case by a series of two equalization blow-down steps co-current to the flow of feed gas. The first blow-down was modeled to reduce the pressure of the adsorbent bed to about 9 bara. The effluent from this first blow-down, which comprised substantially pure methane at relatively low pressure, was sent via line 116 to compressor P200 and then via lines 118 for use primarily as feed for the counter-current $C_1$ purge step via line 119 and the repressurization step. The first blow-down was followed by a co-current purge with substantially pure propane via line 122. The effluent from the propane purge, which included desorbed $C_{2+}$ hydrocarbons from the heating/desorption step, was passed via line 124 to first switching valve SV1, which was switched on and off at discrete times during the cycle, enabled by relatively sharp concentration fronts of different gaseous components traveling through the adsorption bed. Substantially pure $C_1$ exited the bed first, followed by a mixture of $C_1$ and $C_2$ ($C_1/C_2$ slop), followed by substantially pure $C_2$, followed by a mixture of $C_2$ and $C_3$ ($C_2/C_3$ slop), followed by a mixture of $C_{3+}$. In general, the sharper the concentration front, the smaller the slop streams. The first slop stream ($C_1/C_2$) was passed via line 126, combined with the $C_1$ stream via line 128, and recompressed by compressor P300, where it was passed via line 130 for use in repressurization. The $C_2$ stream was collected via line 132 and compressed via compressor P400, e.g., for sale as a high purity $C_2$ stream C2. The $C_2/C_3$ slop stream via line 134 and the $C_3$ stream via line 136 were compressed via compressor P500 and used for the $C_3$ purge via line 122.

The co-current $C_3$ purge step was followed by a second blow-down step to bring the pressure of the adsorbent bed down to about 1 bar. The effluent from this second blow-down step (d) was combined with the effluent from the heating step (e) in line 142 and sent via switching valve SV2 for optional further separation using a depropanizer tower DPT. A portion of the $C_3$ recovered in the depropanizer tower DPT was used for the $C_3$ purge step (c) via line 140, and at least a portion of the remainder can optionally represent a $C_3$ sales stream C3 via line 145. The $C_{4+}$ hydrocarbon products from the depropanizer tower DPT can further optionally be sent for transfer, sales, and/or additional processing C4+. The effluent via line 138 from the $C_1$ purge step (f) was compressed via compressor P600 and recycled back the adsorbent bed via line 120 as a portion of the gas required for repressurization step (h). Initial bed repressurization with $C_1$ product was counter-current, in order to keep the product end of the bed clean. Final repressurization was co-current with feed. The flow rates were modeled based on total feed rate of 1 BSCFD. Some advantages of this cycle were observed to include the production of a high pressure $C_1$ stream and the elimination for the need of a gas liquid recovery plant. The only tower required in this process scheme was a single depropanizer As with the process of Example 1 above, the adsorbent bed was externally heated, with the product end of the bed sealed and the inlet end left open. The adsorbent bed was then counter-currently purged at about 3 bar with substantially pure methane, then cooled with the feed end closed and the product end open. The adsorption vessel was then repressurized after the cooling step, with blow-down gas from the equalization step of another bed. The adsorption vessel was then repressurized to the final pressure using a combination of feed gas and internal streams.

Table 2 below shows the stream flow-rates and compositions obtained from a detailed dynamic process simulation of the process, as outlined in FIG. 2, which simulation was built using a custom suite of models developed using the gPROMS® software product.

TABLE 2

Stream compositions for multiple component product stream PTSA process with propane ($C_3$) purge

| Stream | Mole Fractions | | | | Flowrate | Pressure |
| --- | --- | --- | --- | --- | --- | --- |
| | C1 | C2 | C3 | C4 | (MSCFD) | (bara) |
| Feed | 0.93 | 0.04 | 0.01 | 0.01 | 778 | 66 |
| C3 Purge | 0.00 | 0.00 | 1.00 | 0.00 | 134 | 10 |
| C1 Purge | 1.00 | 0.00 | 0.00 | 0.00 | 43 | 2 |
| Repressurization | 1.00 | 0.00 | 0.00 | 0.00 | 222 | 66 |
| C1 Product | 1.00 | 0.00 | 0.00 | 0.00 | 757 | 64 |
| First Slowdown | 1.00 | 0.00 | 0.00 | 0.00 | 145 | 9 |
| HHC Product - Total | 0.54 | 0.27 | 0.19 | 0.00 | 121 | 9 |
| C1 cut | 1.00 | 0.00 | 0.00 | 0.00 | 64 | 9 |
| C1/C2 slop | 0.63 | 0.37 | 0.00 | 0.00 | 3 | 9 |
| C2 cut | 0.01 | 0.99 | 0.00 | 0.00 | 25 | 9 |

TABLE 2-continued

Stream compositions for multiple component product stream PTSA process with propane ($C_3$) purge

| Stream | Mole Fractions | | | | Flowrate (MSCFD) | Pressure (bara) |
| --- | --- | --- | --- | --- | --- | --- |
| | C1 | C2 | C3 | C4 | | |
| C2/C3 slop | 0.00 | 0.30 | 0.70 | 0.00 | 21 | 9 |
| C3+ cut | 0.00 | 0.00 | 1.00 | 0.00 | 9 | 9 |
| Second Blowdown - Total | 0.15 | 0.00 | 0.79 | 0.06 | 153 | 1 |
| BD | 0.00 | 0.00 | 1.00 | 0.00 | 15 | 1 |
| Heat | 0.00 | 0.00 | 0.91 | 0.09 | 103 | 1 |
| Purge | 0.66 | 0.00 | 0.34 | 0.01 | 35 | 1 |

What is claimed is:

1. A process for the separation of $C_{2+}$ hydrocarbons from a natural gas stream, which process comprises:
   a) subjecting said natural gas stream to an adsorption step by introducing it into the feed input end of an adsorbent bed selective for adsorbing said $C_{2+}$ hydrocarbons, which adsorbent bed comprises at least one adsorbent material and a feed input end and a product output end, and which adsorbent bed is operated at a first pressure and a first temperature wherein $C_{2+}$ hydrocarbons are selectively adsorbed by the adsorbent bed and wherein a first $C_1$ product stream having a higher mol % of $C_1$ hydrocarbons than said natural gas stream is retrieved from the product output end of said adsorbent bed;
   b) stopping the introduction of said natural gas stream;
   c) depressurizing said adsorption bed to a second pressure lower than said first pressure;
   d) externally heating said depressurized adsorbent bed to a second temperature greater than said first temperature, thereby causing at least a fraction of the adsorbed $C_{2+}$ hydrocarbons to desorb from the adsorbent bed;
   e) counter-currently flowing through said heated adsorbent bed a first purge gas stream at a third pressure; and
   f) recovering a $C_{2+}$ product stream comprising $C_{2+}$ hydrocarbon components and methane,
   wherein a second purge gas stream is passed co-currently through the adsorption bed following depressurization step (c) and prior to heating step (d).

2. The process of claim 1, further comprising:
   g) externally cooling said adsorbent bed to a third temperature lower than said second temperature; and
   h) repressurizing the adsorbent bed to within 90% of said first pressure.

3. The process of claim 1, wherein the first $C_1$ product stream is greater than 95 mol % methane.

4. The process of claim 3, wherein the first $C_1$ product stream is greater than 98 mol % methane.

5. The process of claim 1, wherein the first purge gas stream is greater than 95 mol % methane.

6. The process of claim 1, wherein the first temperature is from −195° C. to 300° C. and the first pressure is from 1 bara to 600 bara.

7. The process of claim 6, wherein the first temperature is from 20° C. to 150° C. and the first pressure is from 2 to 200 bara.

8. The process of claim 1, wherein the second temperature is from 10° C. to 300° C.

9. The process of claim 8, wherein the second temperature is from 20° C. to 200° C.

10. The process of claim 1, wherein the third temperature is from −195° C. to 300° C.

11. The process of claim 1, wherein the first purge gas stream is selected from the group consisting of nitrogen and methane.

12. The process of claim 1, wherein the second purge gas stream comprises propane.

13. The process of claim 12, wherein the second purge gas stream comprises greater than 95 mol % propane.

14. The process of claim 13, wherein the second purge gas stream comprises greater than 98 mol % propane.

15. The process of claim 12, further comprising retrieving from the product output end of said adsorbent bed a first $C_{2+}$ product stream having a higher mol % of $C_{2+}$ hydrocarbons than said natural gas stream.

16. The process of claim 15, wherein the retrieving of the first $C_{2+}$ product stream is performed concurrently with passing the second purge gas stream through the adsorption bed.

17. The process of claim 16, wherein the first $C_{2+}$ product stream comprises greater than 95 mol % ethane.

18. The process of claim 17, wherein the first $C_{2+}$ product stream comprises greater than 98 mol % ethane.

19. The process of claim 1, wherein the adsorbent bed is comprised of a zeolite adsorbent material comprising a framework structure selected from FER, MFI, BEA, DON, and combinations thereof.

20. The process of claim 19, wherein the zeolite exhibits an Si/Al ratio of at least about 500.

21. The process of claim 15, wherein the adsorbent bed is comprised of zeolite adsorbent material comprising a framework structure selected from FER, MFI, BEA, DON, and combinations thereof.

22. The process of claim 21, wherein the zeolite exhibits an Si/Al ratio of least about 500.

23. The process of claim 1, wherein the adsorbent bed has open flow channels throughout its entire length through which the natural gas stream flows.

24. The process of claim 23, wherein the adsorbent bed is a parallel channel contactor.

25. The process of claim 1, wherein reduction in pressure of step c) takes place in two or more steps, and wherein each step reduces the pressure of the adsorbent bed to a lower pressure than the next previous step.

26. The process of claim 1, wherein the external heating of step d) takes place co-current to the direction of the flow through the adsorbent bed.

27. The process of claim 1 wherein the external heating of step d) takes place counter-current to the direction of the flow through the adsorbent bed.

28. The process of claim 1, wherein the heating of step d) is performed under conditions sufficient to cause a thermal wave to travel along the adsorbent bed.

29. The process of claim 28, wherein the thermal wave travels co-current to the direction the gas mixture flow through the adsorbent bed.

30. The process of claim 28, wherein a $T_{90}$ and a $T_{10}$ can be defined with respect to the second temperature and the first temperature such that a temperature differential of $(T_{90}-T_{10})$ occurs over at most 50% of the length of the adsorbent bed.

31. The process of claim 28, wherein the thermal wave exhibits a maximum Peclet number, Pe, less than 10, wherein $Pe=(U*L)/\alpha$, where U represents a heat exchange fluid velocity, L represents a characteristic distance over which heat is transported in a direction roughly perpendicular to fluid flow, and a represents an effective thermal diffusivity of the contactor over the distance L, and wherein U is from about 0.01 m/s to about 100 m/s, and L is less than 0.1 meter.

32. The process of claim 1, wherein less than about 40% of the open pores of the adsorbent bed have diameters greater than about 20 angstroms and less than about 1 micron.

33. The process of claim 1, wherein the first pressure is at least 500 psig.

34. The process of claim 1, wherein the adsorbent bed is comprised of a microporous adsorbent material selected from zeolites, AlPOs, SAPOs, MOFs, ZIFs, carbon, and combinations thereof.

35. The process of claim 1, wherein the adsorbent bed is comprised of an adsorbent material selected from cationic zeolites, amine-functionalized mesoporous materials, stannosilicates, carbon, and combinations thereof.

\* \* \* \* \*